United States Patent
Nusier et al.

(10) Patent No.: US 10,442,327 B2
(45) Date of Patent: Oct. 15, 2019

(54) SEAT BOTTOM TENSION MEMBER

(71) Applicant: FORD GLOBAL TECHNOLOGIES, LLC, Dearborn, MI (US)

(72) Inventors: Saied Nusier, Canton, MI (US); John Wayne Jaranson, Dearborn, MI (US); Mohamed Ridha Baccouche, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 223 days.

(21) Appl. No.: 15/389,514

(22) Filed: Dec. 23, 2016

(65) Prior Publication Data

US 2018/0178685 A1 Jun. 28, 2018

(51) Int. Cl.
| | |
|---|---|
| *B60N 2/42* | (2006.01) |
| *B60N 2/68* | (2006.01) |
| *B60N 2/427* | (2006.01) |
| *B60N 2/06* | (2006.01) |
| *B60N 2/50* | (2006.01) |

(52) U.S. Cl.
CPC ............ *B60N 2/4221* (2013.01); *B60N 2/06* (2013.01); *B60N 2/42709* (2013.01); *B60N 2/509* (2013.01); *B60N 2/68* (2013.01); *B60N 2/686* (2013.01)

(58) Field of Classification Search
CPC .... B60N 2/4221; B60N 2/06; B60N 2/43709; B60N 2/509; B60N 2/686; B60N 2/68
USPC ...................................................... 297/216.1
See application file for complete search history.

(56) References Cited

U.S. PATENT DOCUMENTS

| | | | |
|---|---|---|---|
| 2,667,916 A | 4/1948 | Burd | |
| 3,258,259 A | 6/1966 | Bohlin | |
| 4,065,182 A | 12/1977 | Braniff et al. | |
| 5,085,487 A | 2/1992 | Weingartner et al. | |
| 5,129,706 A * | 7/1992 | Ghezzi ................ | B60N 2/4221 297/216.1 X |
| 5,248,185 A | 9/1993 | Weingartner et al. | |
| 5,769,499 A | 6/1998 | Dudash et al. | |
| 5,871,195 A | 2/1999 | Gauger | |
| 6,045,186 A | 4/2000 | Butt et al. | |
| 6,357,827 B1 | 3/2002 | Brightbill et al. | |
| 6,595,586 B2 | 7/2003 | Brightbill et al. | |
| 7,644,982 B2 | 1/2010 | Paluch | |
| 7,668,329 B2 | 2/2010 | Matsuhashi | |
| 7,780,230 B2 * | 8/2010 | Serber ................. | B60N 2/0745 297/216.1 |
| 7,976,103 B2 | 7/2011 | Gamache et al. | |
| 8,434,823 B2 | 5/2013 | Du et al. | |
| 8,449,012 B2 | 5/2013 | Siebold et al. | |
| 8,882,202 B2 | 11/2014 | Petzel et al. | |

(Continued)

FOREIGN PATENT DOCUMENTS

DE 10 2009 051 120 5/2011

*Primary Examiner* — Anthony D Barfield
(74) *Attorney, Agent, or Firm* — Vichit Chea; Price Heneveld LLP (57) ABSTRACT

A lower seating structure comprises an upper support layer, an intermediate resilient layer, a molded bottom seat panel, a seat frame assembly, and a tension member. The molded bottom seat panel extends across a width of the lower seating structure and the tension member is fixedly attached to each of a pair of opposed sides of the molded bottom seat panel and extends across the width of the lower seating structure.

13 Claims, 9 Drawing Sheets

(56) References Cited

U.S. PATENT DOCUMENTS

| | | |
|---|---|---|
| 9,573,502 B2 | 2/2017 | Seki et al. |
| 9,596,940 B2 | 3/2017 | Petzel et al. |
| 2002/0060493 A1 | 5/2002 | Nishino et al. |
| 2005/0200166 A1 | 9/2005 | Noh |
| 2009/0039690 A1 | 2/2009 | Simon et al. |
| 2010/0072804 A1* | 3/2010 | Stauske ............... B60N 2/5621 297/452.38 X |

* cited by examiner

SEAT BOTTOM TENSION MEMBER

FIELD OF THE INVENTION

The present invention generally relates to an apparatus and method for maintaining the integrity of an automotive seat assembly during a frontal impact event, and more particularly, to a tension member incorporated in a seat bottom panel to prevent or reduce fracture of the seat bottom panel during and subsequent a frontal impact event.

BACKGROUND OF THE INVENTION

Motor vehicle seating assemblies provided in modern motor vehicles are primarily designed to provide a platform by which the motor vehicle occupant can safely operate the motor vehicle or travel within the motor vehicle in a comfortable and pleasant manner. Another function of motor vehicle seating assemblies is to assist in restraining the occupant in the event of an impact or rollover event. In the case of a frontal impact event, the motor vehicle seating assembly is particularly adapted to restrain the occupant within a prescribed range of positions so that the motor vehicle's active and passive restraint systems can operate appropriately.

In the case of the lower seating assembly of the motor vehicle seating assembly, the lower seating assembly is typically downwardly inclined in a rearward direction to provide an ergonomic seating platform. This configuration also serves to assist in positioning the motor vehicle occupant of the motor vehicle seating assembly, whereby in the event of a frontal impact event, the forward momentum of the motor vehicle occupant generates a force against the lower seating assembly. By virtue of the inclined configuration of the lower seat assembly, this force is resolved into a force vector having a forward direction, which tends to move the motor vehicle occupant forward. The force, however, is also resolved into a force vector having a downward direction, which tends to urge the motor vehicle occupant downward into the lower seating assembly and thereby assist in restraining the motor vehicle occupant in a position where the active restraint system comprising the seatbelt assembly and the passive restraint system comprising one or more airbags are most effective.

Additionally, it is also desirable that motor vehicle seating assemblies be constructed of relatively lightweight materials, by which the mass of the motor vehicle can be reduced and through which the overall fuel economy of the motor vehicle can be improved. For example, lower seating assemblies may include seat bottom panels or other structural members made out of relatively lightweight materials, such as a carbon fiber reinforced polymer, due to their relatively low density and high strength. However, as such materials tend to be brittle and have low or limited ductility, the significant downward force generated by the motor vehicle occupant against the lower seating assembly during a frontal impact event can cause the seat bottom panel to fracture during a frontal impact event and thereby lose its structural integrity. A device and method that would prevent unwanted fracture of such seat bottom panels or other structural members during a frontal impact event is desired.

SUMMARY OF THE INVENTION

According to one aspect of the present invention, a lower seating structure comprises an upper support layer, an intermediate resilient layer, a molded bottom seat panel, a seat frame assembly, and a tension member. The molded bottom seat panel extends across a width of the lower seating structure and the tension member is fixedly attached to each of a pair of opposed sides of the molded bottom seat panel and extends across the width of the lower seating structure.

According to another aspect of the present invention, a seating assembly comprises a lower seating structure further comprising a seat frame assembly, a molded bottom seat panel, and a tension member, wherein the molded bottom seat panel extends across a width of the lower seating structure and the tension member is fixedly attached to a tension member anchor on each of a pair of opposed sides of the bottom seat panel and extends across the width of the bottom seat panel.

According to yet another aspect of the present invention, a method of maintaining the integrity of an automotive seat assembly during a frontal impact event comprises the steps of assembling a lower seating structure having a seat frame assembly, an upper support layer, an intermediate resilient layer, and a molded bottom seat panel, wherein the molded bottom seat panel extends across a width of the lower seating structure and comprises a pair of opposed sides and a tension member extending across the width of the molded bottom seat panel, the tension member being fixedly attached to a tension member anchor on each of a pair of opposed sides of the molded bottom seat panel, and mounting the lower seating structure to a motor vehicle floor pan via the seat frame assembly.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
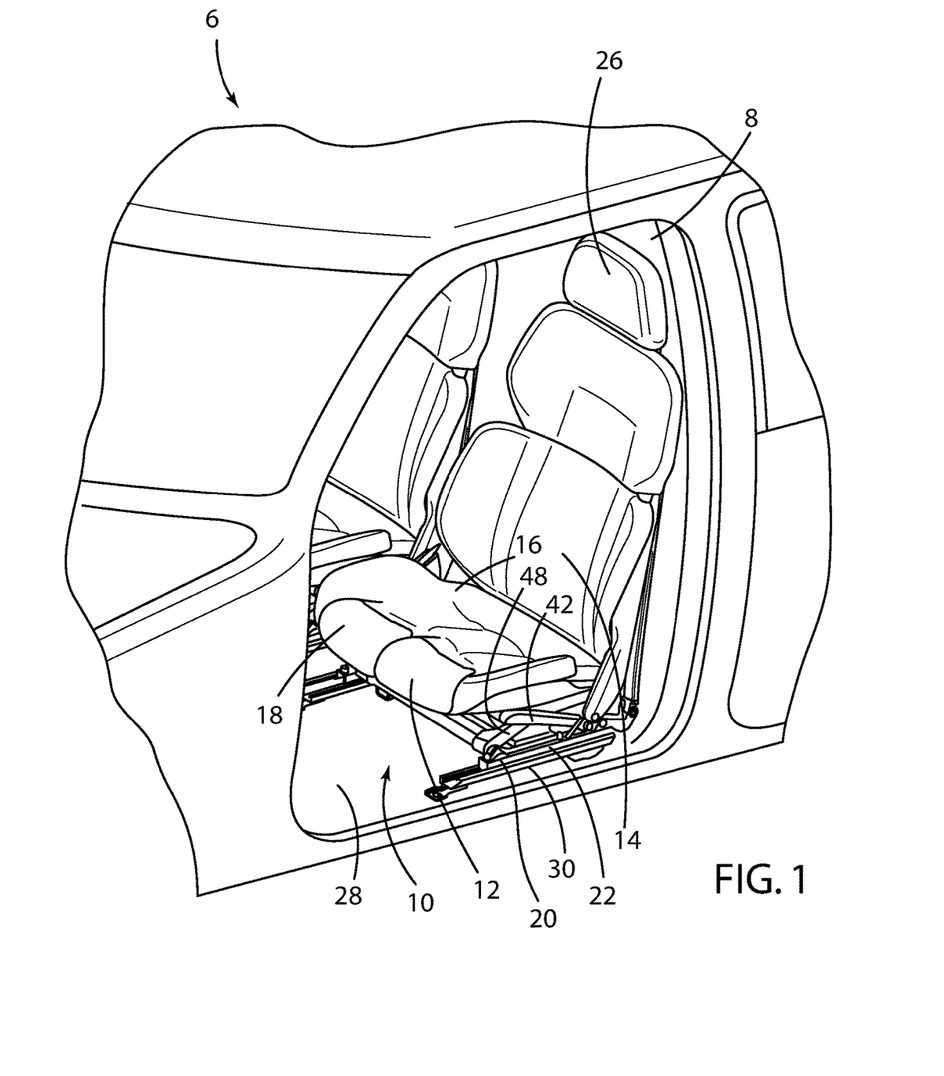
FIG. 1 is a front side perspective view of an automotive seat assembly installed in a motor vehicle in accordance with the present disclosure.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
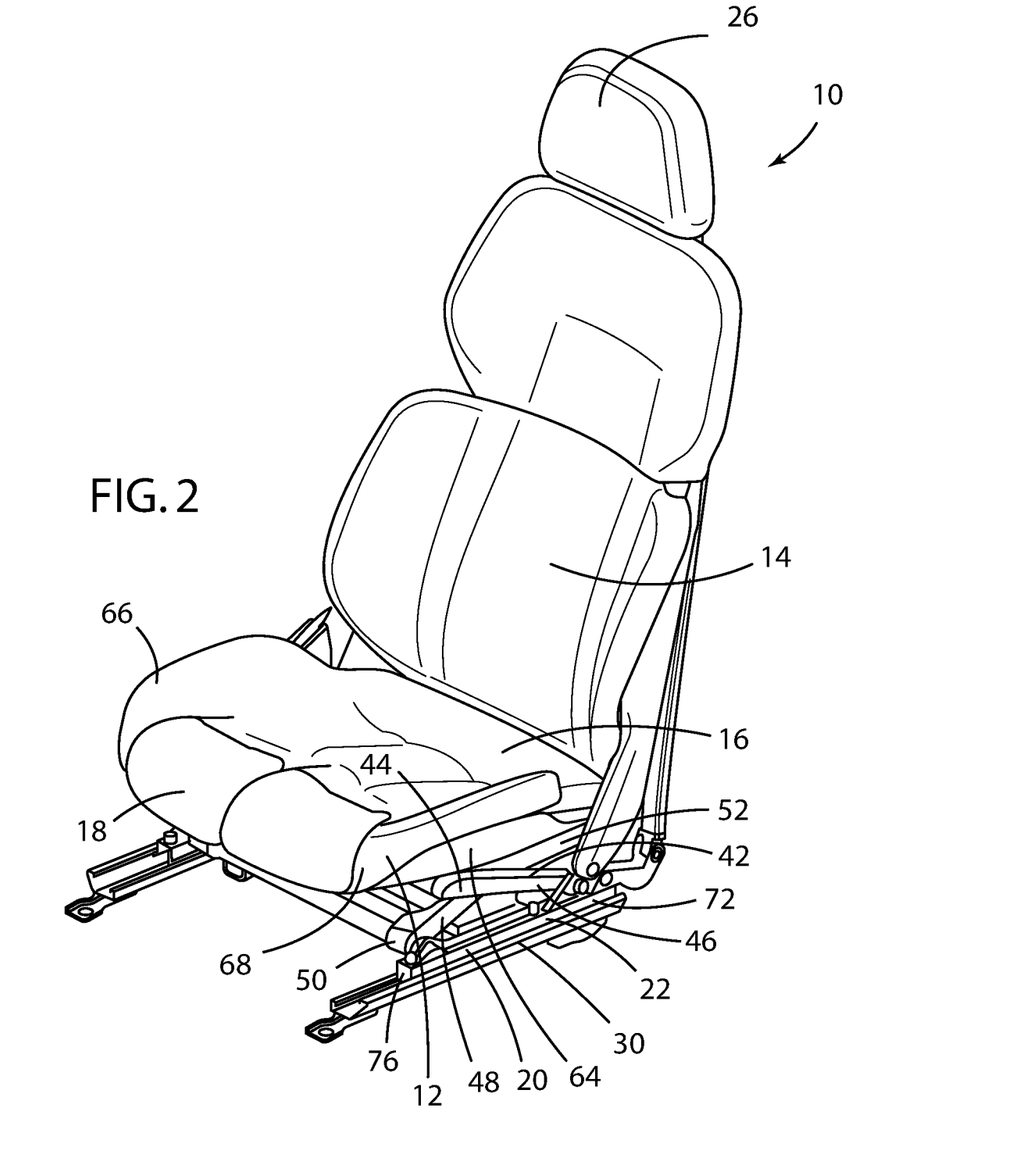
FIG. 2 is a front side perspective view of the automotive seat assembly of FIG. 1.
Figure 3:
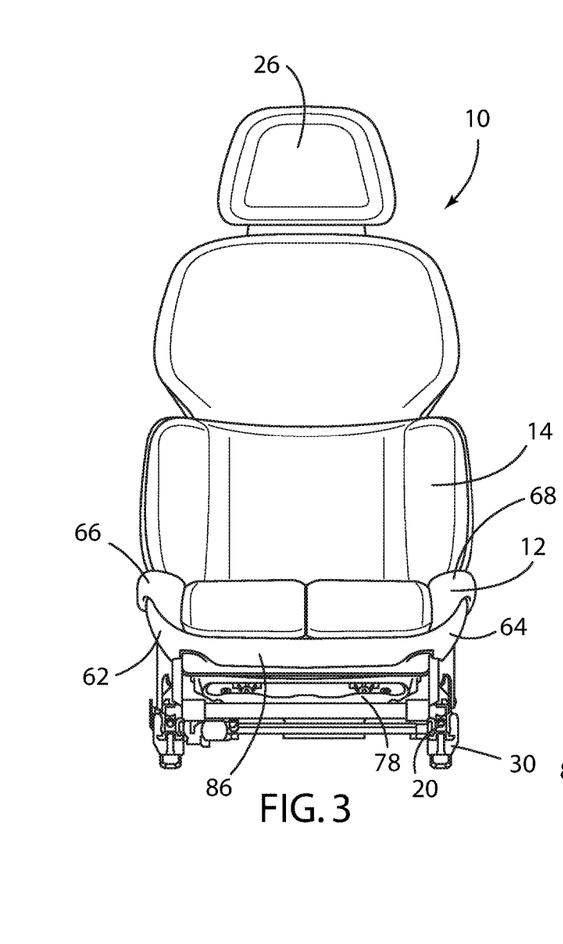
FIG. 3 is a front view of the automotive seat assembly of FIG. 1.

Referring to FIGS. 1-3, reference numeral 10 generally designates a vehicle seating assembly for use in a vehicle cabin 8 of a motor vehicle 6. The motor vehicle seating assembly 10 includes a lower seating structure 12 pivotably coupled to a raised seatback structure 14. As shown in FIG. 1, the motor vehicle seating assembly 10 is generally configured for use in a variety of motor vehicles 6 in a front driver seat, a front passenger seat, or a rear seat of the motor vehicle 6 and generally includes the aforementioned lower seating structure 12 and raised seatback structure 14. A head restraint 26 is also mounted to the top of the raised seatback structure 14. The motor vehicle seating assembly 10 may be configured to be mounted on a support surface, such as a floor pan 28 of the vehicle 6. A seat track assembly 30 may be coupled to the lower seating structure 12 via a seat frame assembly 20 to facilitate fore and aft positioning of the motor vehicle seating assembly 10, as is known. The motor vehicle seating assembly 10 is generally designed for the comfort of a motor vehicle occupant, as well as to accommodate and protect the motor vehicle occupant during a collision event.

Figure 10:
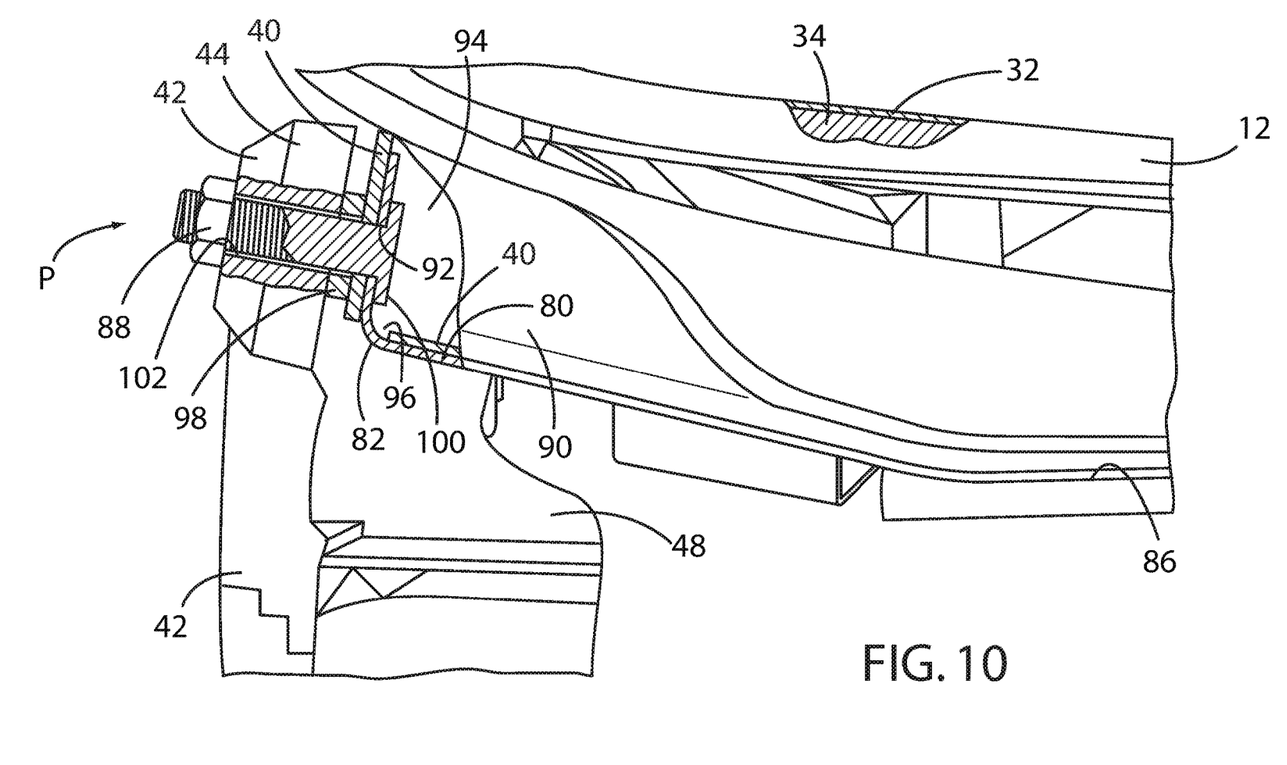
FIG. 10 is a partial front view of the first embodiment automotive seat assembly of FIG. 1 with the tension member installed, subsequent to a frontal impact event.
Figure 11:
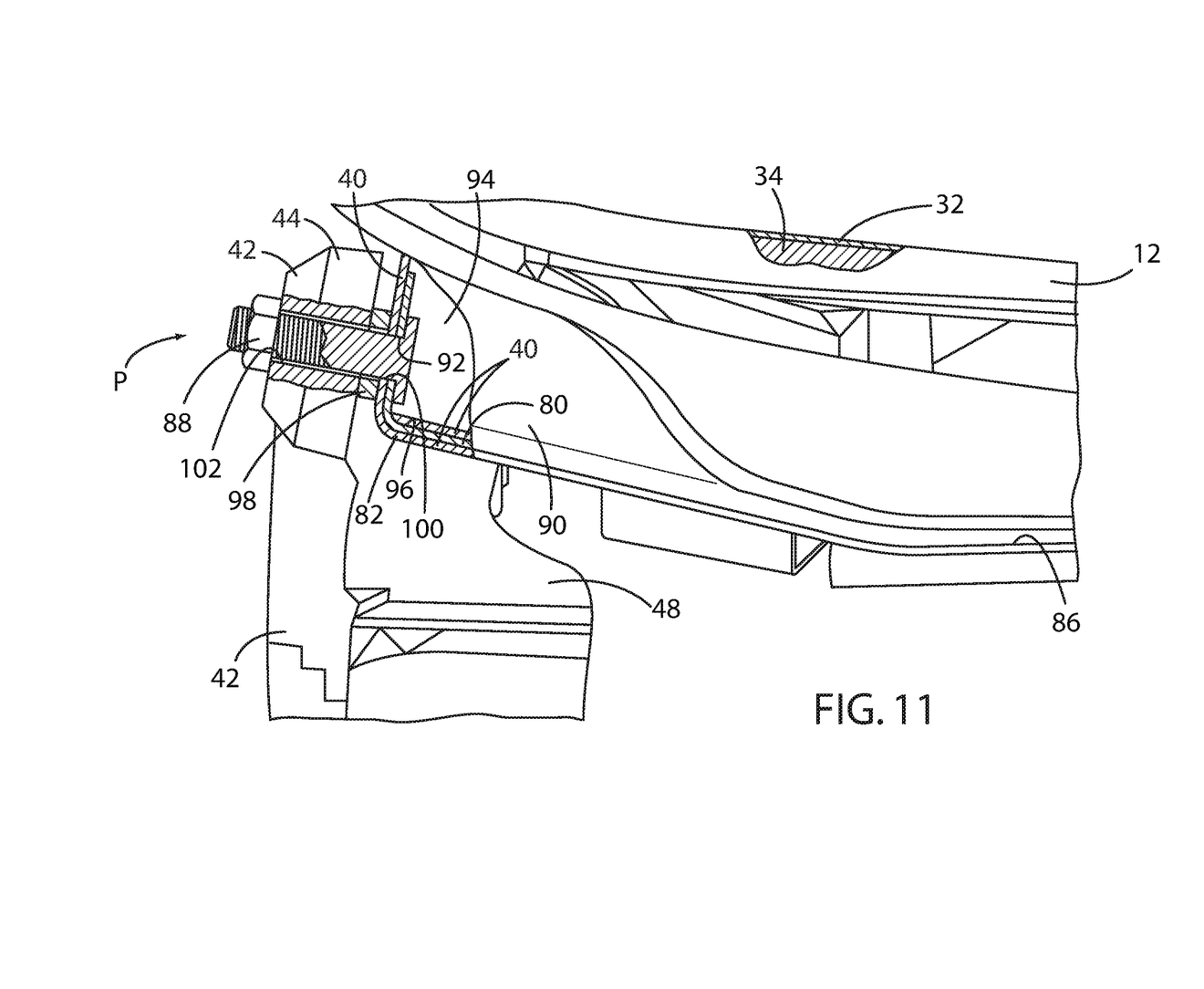
FIG. 11 is a partial front view of a second embodiment of the automotive seat assembly of FIG. 1 with the tension member installed, subsequent to a frontal impact event.

As best shown in FIGS. 10 and 11, the lower seating structure 12 is constructed as a multilayer component and includes an upper support layer 32, one or more intermediate resilient layers 34, and a bottom seat panel 40. The upper support layer 32 is typically fabricated from a flexible material, such as cloth, leather, or vinyl, so as to readily adapt to the configurations of the motor vehicle occupant seated in the motor vehicle seating assembly 10. The intermittent resilient layer 34 is typically fabricated from an elastomeric material, such as foam. One or more air bladders (not shown) may be provided to allow for adjustable firmness of the lower seating structure 12. The intermittent resilient layer 34 is designed to provide comfort and even load distribution of the motor vehicle occupant when seated in the motor vehicle seating assembly 10.

The bottom seat panel 40 preferably forms the bottom of the lower seating structure 12 extending across a width of the lower seating structure 12, and is preferably comprised of a generally rigid yet lightweight material, such as a carbon fiber reinforced polymer, to provide rigidity and support to the lower seating structure 12. It is also desirable that motor vehicle seating assembly 10 be constructed of lighter materials, by which the mass of the motor vehicle can be reduced and through which the overall fuel economy the motor vehicle can be improved. The use of a carbon fiber reinforced polymer provides a lower weight advantage due to its relatively low density and high strength, but its low ductility leads to fracture. The solutions disclosed herein address this disadvantage. It should be appreciated that while the preferred embodiment is disclosed as being comprised of a carbon fiber resin, other materials that provide comparable low density and low ductility can be employed to provide the requisite structure. The objective by the use of such materials is to provide a lightweight yet robust support structure for the lower seating structure 12, in accordance with the present disclosure as further described herein.

Figure 4:
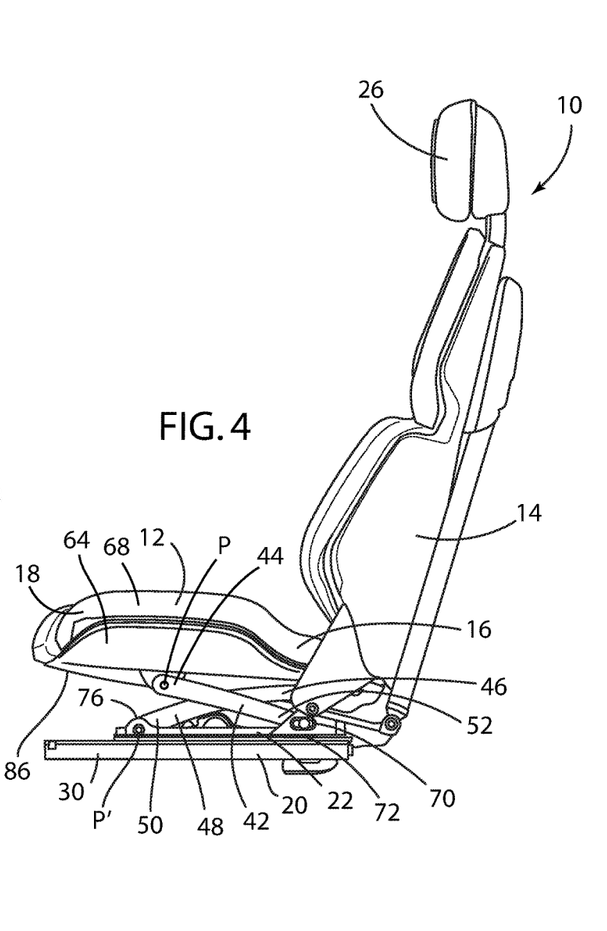
FIG. 4 is side view of the automotive seat assembly of FIG. 1.
Figure 5:
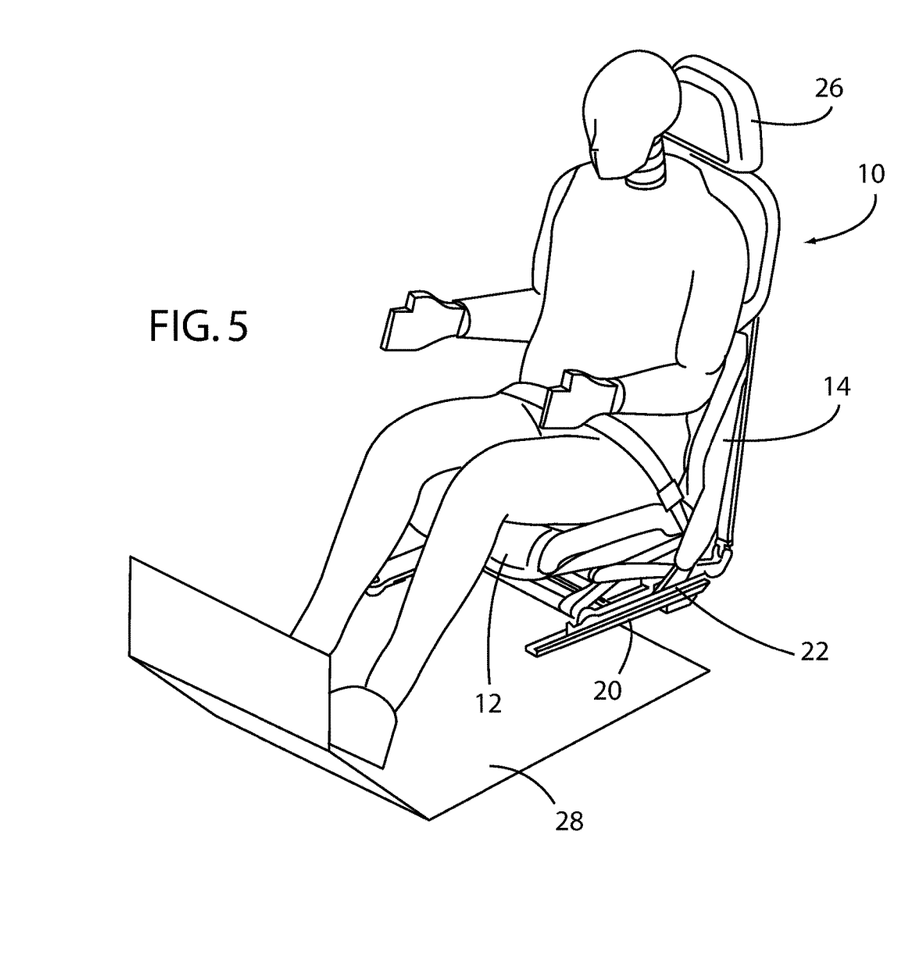
FIG. 5 is a front side perspective view of the automotive seat assembly of FIG. 1, within which an occupant is supported.
Figures 6, 7:
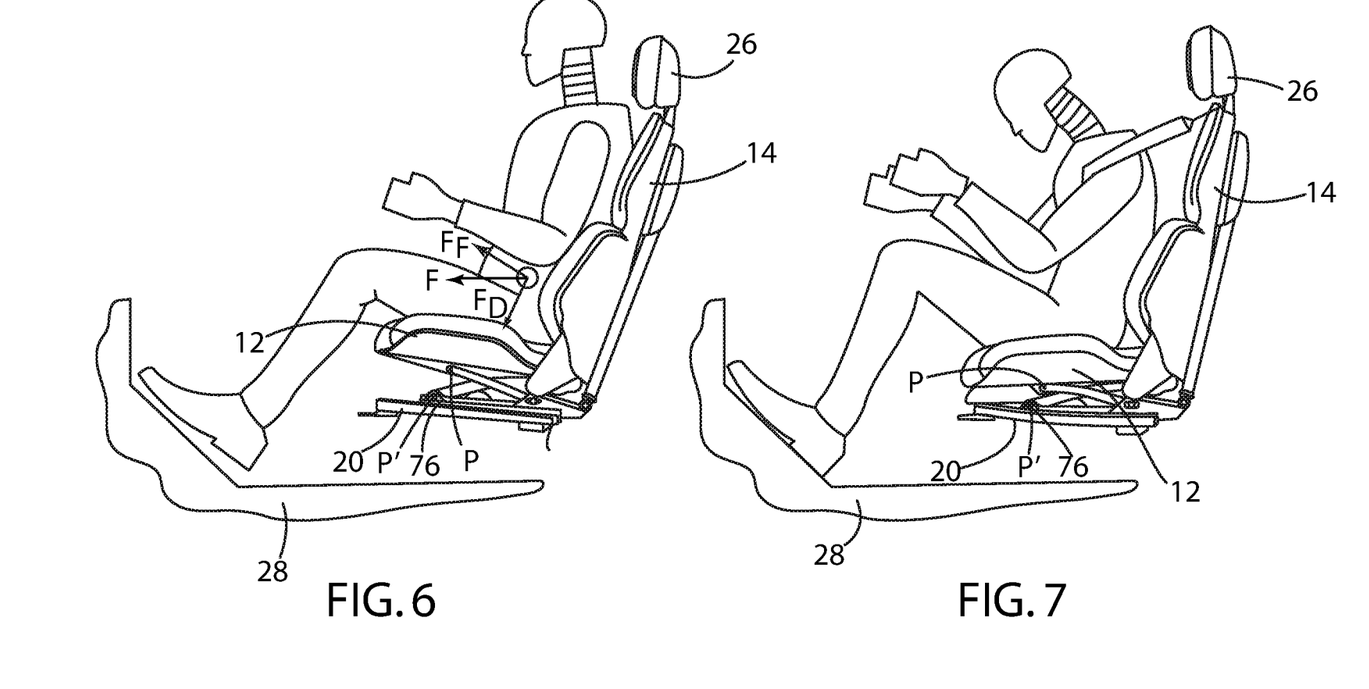
FIG. 6 is a side view of the automotive seat assembly of FIG. 1, within which an occupant is supported prior to a frontal impact event.
FIG. 7 is a side view of the automotive seat assembly of FIG. 1, within which an occupant is supported subsequent to a frontal impact event

As best shown in FIGS. 4, 6, and 7, the seat frame assembly 20 preferably includes a slidable seat rail 22, a first support link 42 having a forward end 44 and a rearward end 46, the forward end 44 being operably coupled to the bottom seat panel 40 at a tension member anchor 36 and the rearward end 46 being operably coupled with the slidable seat rail 22. A second support link 48 has a forward end 50 and a rearward end 52, the forward end 50 being operably coupled to the slidable seat rail 22 and the rearward end 52 being operably coupled with the bottom seat panel 40.

Figure 9:
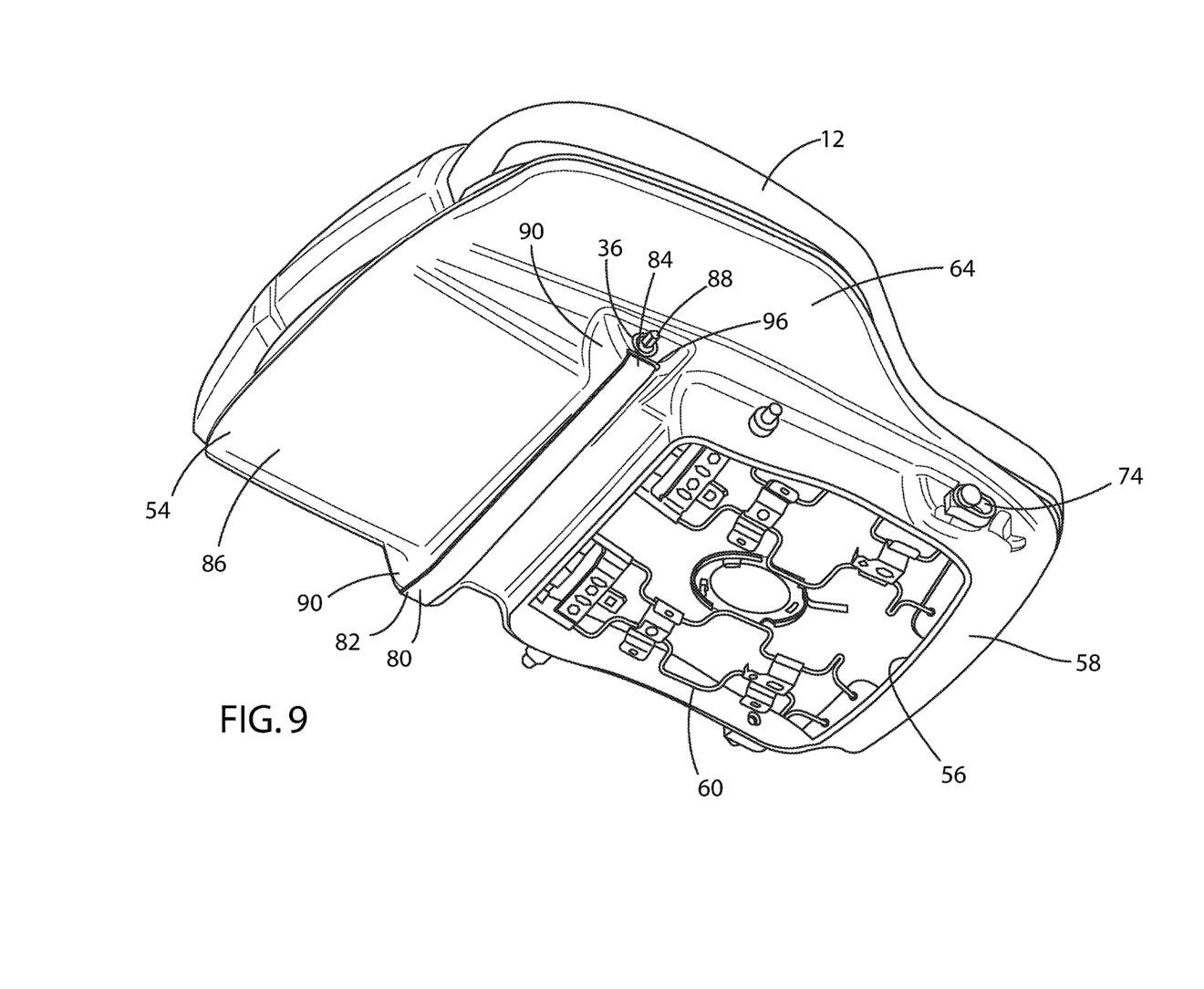
FIG. 9 bottom side perspective view of a first embodiment of the lower seating assembly of the automotive seat assembly of FIG. 1.

As best shown in FIG. 9, the bottom seat panel 40 forms a substantially continuous lower surface 86 at a forward portion 54 thereof. An opening 56 is provided at a rearward portion 58 of the bottom seat panel 40 to accept a suspension spring assembly 60 for the lower seating structure 12. The bottom seat panel 40 also is provided with a pair of opposed flanges 62, 64, one on each of the opposed sides 66, 68 of the bottom seat panel 40.

Preferably, the rearward end 46 of the first support link 42 is slidably coupled with the slidable seat rail 22 and the rearward end 52 of the second support link 48 is slidably coupled with the rearward portion 58 of the bottom seat panel 40. That is, the forward end 44 of the first support link 42 is preferably pivotally mounted at an upper pivot P to the forward portion 54 of the bottom seat panel 40, and the forward end 50 of the second support link 48 is pivotally mounted at a lower pivot P to a forward portion 76 of the slidable seat rail 22. Further, the rearward end 46 of the first support link 42 is mounted within a lower slot 70 provided on a rearward portion 72 of the slidable seat rail 22 and the rearward end 52 of the second support link 48 is mounted within an upper slot 74 disposed on the rearward portion 58 of the bottom seat panel 40. The lower and upper slots 70, 74 allow the first and second support links 42, 48 to pivot about the upper pivot P and the lower pivot P' at the forward end 44, 50 of each of the first and second support links 42, 48, while the rearward end 46, 52 of each of the first and second support links 42, 48 slide horizontally within the lower and upper slots 70, 74, thus allowing the lower seating structure 12 of the motor vehicle seating assembly 10 to be raised upwardly or lower downwardly via operation of motor assembly 78. It should be appreciated that the lower seating structure 12 can be provided with a mechanical height adjustment system (not shown).

During a frontal impact event, such as when the motor vehicle 6 impacts another vehicle or a fixed or movable object in a frontal path of the motor vehicle 6, a longitudinally extending deceleration pulse is applied throughout the motor vehicle 6, including the floor pan 28, the seat frame assembly 20 attaching the motor vehicle seating assembly 10 to the floor pan 28, and the seatbelt anchors (if any). For example, according to the test protocol set forth in Federal Motor Vehicle Safety Standard No. 208, the motor vehicle 6 is impacted against a rigid wall at a nominal forward velocity of 35 mph. As a consequence of this impact, the motor vehicle 6 decelerates to a full stop within milliseconds, and the deceleration pulse during the impact event causes the motor vehicle occupant to move forward, as described above.

As noted above, however, the lower seating structure 12 is downwardly inclined in a rearward direction. That is, a rear portion 16 of the lower seating structure 12 proximate the pivotal attachment with the seatback structure 14 is higher than a forward portion 18 of the lower seating structure 12. As a consequence of this geometry, during a frontal impact event, the forward momentum of the motor vehicle occupant generates a force F against the direction of the deceleration pulse, as shown in FIG. 6. The inclined configuration of the lower seating structure 12 resolves this force F into a forward force vector $F_F$ having a substantially forward and lesser upward direction. As a result, the motor vehicle occupant is urged forward and upward along the incline of the lower seating structure 12, as shown in FIG. 7. The force F, however, is also resolved into a downward force vector $F_D$ having a lesser forward and substantially downward direction, which urges the motor vehicle occupant downward into the lower seating structure 12. This downward force vector $F_D$ assists in restraining the motor vehicle occupant in a position, where the active restraint system comprising the seatbelt assembly and passive restraint system comprising one or more airbags are most effective. As is also shown in FIG. 7, the downward force vector $F_D$ tends to collapse the first and second support links 42, 48, at their forward ends 44, 50, respectively, thus absorbing and dissipating the impact deceleration pulse experienced by the motor vehicle occupant.

Figure 8:
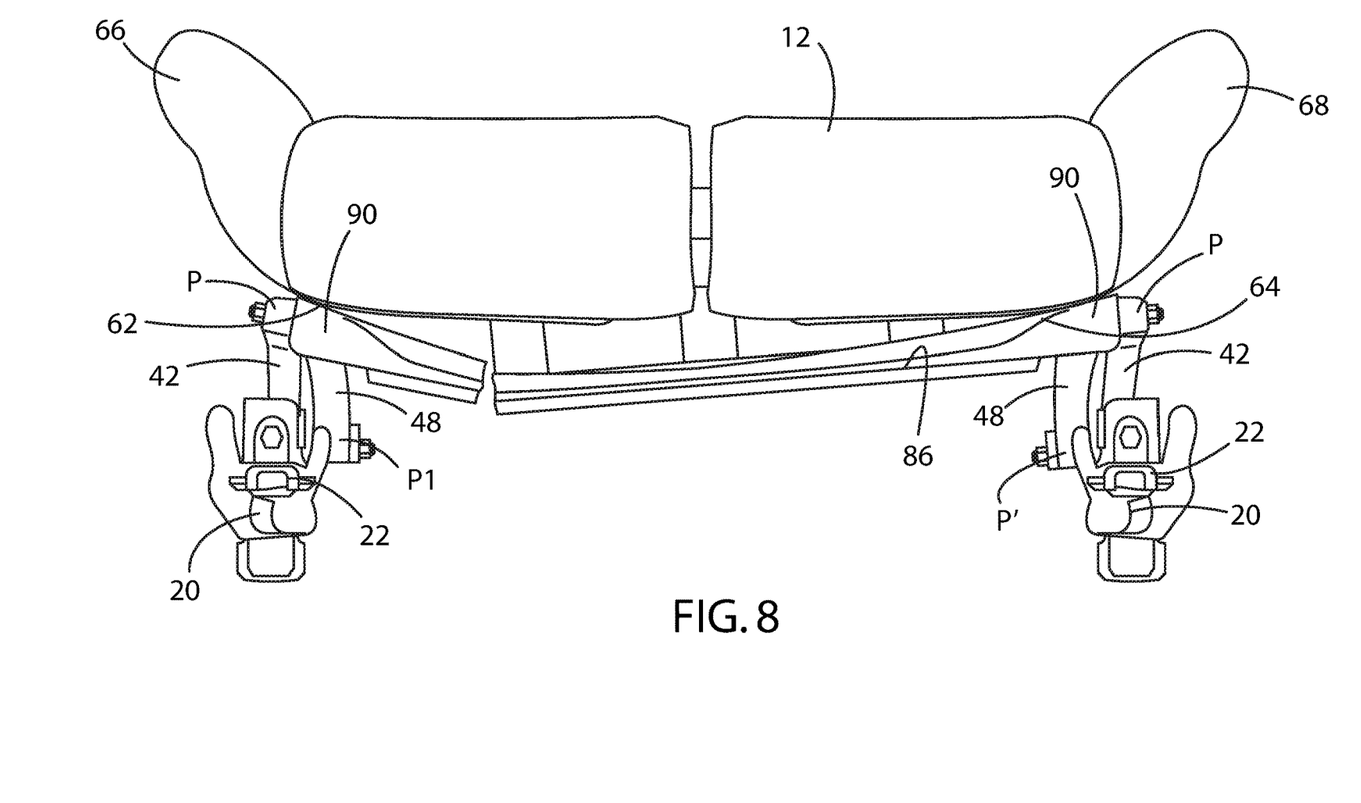
FIG. 8 is a partial front view of the automotive seat assembly of FIG. 1 without the tension member installed, subsequent to a frontal impact event.

However, in the case where the bottom seat panel 40 is made out of a relatively brittle material, such as carbon fiber reinforced polymer, the downward force vector $F_D$ also tends to damage the bottom seat panel 40 under such downward occupant loading during a frontal impact event. As noted above, the significant downward force vector $F_D$ on the bottom seat panel 40, particularly in the case of materials with limited ductility, causes the bottom seat panel 40 to fracture, and, in some cases, a complete disintegration or separation of the bottom seat panel 40 can occur, as depicted in FIG. 8.

In accordance the present disclosure, the damage to the bottom seat panel 40 under the circumstances described above can be mitigated, if not entirely resolved, by the use of a tension member 80 attached to the bottom seat panel 40, as shown in FIGS. 9, 10, and 11. Preferably, the tension member 80 is constructed as a relatively thin strip of metal having opposed ends 82, 84 which are each fixedly attached to each of the pair of opposed sides 66, 68 of the bottom seat panel 40 and extends across the width of the lower seating structure 12. Alternatively, the tension member 80 can be constructed as a cable having a suitable tensile strength similarly extending across the width of the lower seating structure 12.

As shown in FIGS. 9 and 10, the tension member 80 is disposed in juxtaposed relation below the lower surface 86 of the lower seating structure 12. The tension member 80 extends across the width of the bottom seat panel 40 proximate the forward portion 54 of the bottom seat panel 40. Preferably, each of the pair of opposed sides 66, 68 of the bottom seat panel 40 comprises the tension member anchor 36, and the tension member 80 comprises opposed attachment ends 82, 84, each of the opposed attachment ends 82, 84 being secured at the tension member anchor 36 on the opposed sides 66, 68 of the bottom seat panel 40. The tension member anchors 36 are mounted preferably on a laterally extending boss 90 disposed on each side 66, 68 of the bottom seat panel 40 between the substantially continuous lower surface 86 at the forward portion 54 and one of the pair of opposed flanges 62, 64 of the bottom seat panel 40.

In the embodiment shown, the tension member anchor 36 comprises a tension member attachment fastener 88 that forms the upper pivot P for the first support link 42. In accordance with this embodiment, each end of the tension member 80, which is preferably fabricated of high tensile strength steel, is provided with an opening 92 machined therethrough. Each of the pair of opposed sides 66, 68 of the bottom seat panel 40 is provided with a recess 94 within which one of the opposed attachment ends 82, 84 of the tension member 80 is received via a slot 96 and through which the tension member attachment fastener 88 extends. A bushing 98 is also provided between the lower seating structure 12 and the forward end 44 of the first support link 42 to facilitate the latter's rotation relative the former. After one of the opposed attachment ends 82, 84 of the tension member 80 is inserted into the recess 94, the tension member attachment fastener 88 is inserted and is passed through the opening 92 in the ends 82, 84 of the tension member 80, the recess 94, an opening 100 in the bottom seat panel 40, the bushing 98, and an opening 102 in the forward end 44 of the first support link 42, where the forward end 44 of the first support link 42 is free to pivot in relation to the bottom seat panel 40.

While the tension member 80 is depicted as a separate component in the Figures, it should be appreciated that the tension member 80 may be integrated into the bottom seat panel 40, as shown in FIG. 11. That is, particularly where the bottom seat panel 40 is fabricated from molded carbon fiber reinforced polymer, the bottom seat panel 40 is formed via an injection molding process, as is known in the art, where resin is injected into the mold containing the carbon fiber reinforcement. During this injection molding process, it is contemplated that the tension member 80 may be introduced within the mold, across the width of the bottom seat panel 40 as described above, wherein the tension member 80 may be physically integrated with the bottom seat panel 40 during the molding process.

As shown in FIGS. 10 and 11, the addition of the tension member 80 significantly reduces and mitigates damage to the bottom seat panel 40 as a consequence of a frontal impact event. Rather, as the downward force vector $F_D$ on the bottom seat panel 40 is applied, the tension member 80, mounted on either side 66, 68 of the bottom seat panel 40 and operably coupled with the seat frame assembly 20, shares the downward force vector $F_D$ and reduces the downward force vector $F_D$ supported solely by the bottom seat panel 40. Thus, very limited fracture of the bottom seat panel 40 occurs, which is instead held together by the metal strip of the tension member 80 under the downward force vector $F_D$. The tension member 80 thus assists in maintaining the integrity of the bottom seat panel 40 from disintegrating or separating during a frontal impact event, whereby the motor vehicle occupant can be more reliably restrained within a robust structure for proper achievement of occupant restraint using active and passive restraint systems.

By adding the tension member 80 to the bottom seat panel 40 and across the width of the lower seating structure 12, the tension member 80 contributes to the structural integrity of the lower seating structure 12 even if the material of the bottom seat panel 40 were to fracture. The tension member 80 can further be added to the lower seating structure 12 with a very low weight penalty. That is, since the tension member 80 can be constructed out of a thin metal strip or a cable having a high tensile strength, it can be provided at a very low weight. The tension member 80 will also function effectively without the need to support any bending loads, which tend to require a relatively large section modulus with relatively large additional weight and packaging issues associated with a large section modulus. Thus, minimum packaging space with minimum additional weight is obtained via the disclosed tension member 80. The tension member 80 can be molded during the carbon fiber manufacturing process without additional packaging space needed. When the bottom seat panel 40 is pushed down due to downward load of the motor vehicle occupant, the tension member 80 is placed in tension and holds the bottom seat panel 40 from complete separation due to fracture.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A seating assembly comprising a lower seating structure further comprising a seat frame assembly, a polymeric molded bottom seat panel, and a tension member, wherein the polymeric molded bottom seat panel extends across a width of the lower seating structure and the tension member is fixedly attached to a tension member anchor on each of a pair of opposed sides of the polymeric molded bottom seat panel and extends across the width of the polymeric molded bottom seat panel, wherein the seat frame assembly comprises a slidable seat rail, a first support link having a forward end and a rearward end, the forward end of the first support link being operably coupled to the polymeric molded bottom seat panel at the tension member anchor and the rearward end of the first support link being operably coupled with the slidable seat rail, and a second support link having a forward end and a rearward end, the forward end of the second support link being operably coupled to the slidable seat rail and the rearward end of the second support link being operably coupled with the polymeric molded bottom seat panel.

2. The seating assembly of claim 1, wherein the rearward end of the first support link is slidably coupled with the slidable seat rail and the rearward end of the second support link is slidably coupled with the polymeric molded bottom seat panel.

3. The seating assembly of claim 1, wherein the tension member comprises a tension member attachment fastener and the tension member comprises opposed attachment ends, each of the opposed attachment ends of the tension member being secured at the tension member attachment fastener on each of the pair of opposed sides of the polymeric molded bottom seat panel.

4. The seating assembly of claim 3, wherein each of the pair of opposed sides comprises a recess within which a one of the opposed attachment ends of the tension member is received and through which the tension member attachment fastener extends.

5. The seating assembly of claim 4, wherein the tension member attachment fastener on the one of the pair of opposed sides of the polymeric molded bottom seat panel extends through a one of the opposed attachment ends of the tension member and the forward and of the first support link.

6. The seating assembly of claim 4, wherein the polymeric molded bottom seat panel comprises a substantially continuous lower surface at a forward portion of the polymeric molded bottom seat panel and an opening at a rearward portion of the polymeric molded bottom seat panel, the tension member extending across the width of the polymeric molded bottom seat panel proximate the forward portion of the polymeric molded bottom seat panel.

7. The seating assembly of claim 6, wherein each of the pair of opposed sides of the polymeric molded bottom seat panel comprises an opposed flange, and each of the tension member attachment fasteners is mounted on a laterally extending boss disposed between the substantially continuous lower surface at the forward portion and an opposed flange of the polymeric molded bottom seat panel.

8. A lower seating structure comprising an upper support layer, an intermediate resilient layer, a polymeric molded bottom seat panel, a seat frame assembly, and a tension member, wherein the polymeric molded bottom seat panel extends across a width of the lower seating structure and the tension member is fixedly attached to each of a pair of opposed sides of the polymeric molded bottom seat panel and extends across the width of the lower seating structure,
  wherein each of the pair of opposed sides of the polymeric molded bottom seat panel comprises a tension member anchor and the tension member comprises opposed attachment ends, the opposed attachment ends of the tension member being secured at the tension member anchor on each of the opposed side of the polymeric molded bottom seat panel; and
  wherein the seat frame assembly comprises a slidable seat rail and a first support link having a forward end and a rearward end, the forward end of the first support link being operably coupled to the polymeric molded bottom seat panel at the tension member anchor and the rearward end first support link being operably coupled with the slidable seat rail.

9. The lower seating structure of claim 8, wherein the seat frame assembly comprises a second support link having a forward end and a rearward end, the forward end of the second support link being operably coupled to the slidable seat rail and the rearward end of the second support link being operably coupled with a rear portion of the polymeric molded bottom seat panel.

10. The lower seating structure of claim 8, wherein the tension member anchor comprises a tension member attachment fastener.

11. The lower seating structure of claim 8, wherein the polymeric molded bottom seat panel is fabricated from molded carbon fiber reinforced polymer.

12. The lower seating structure of claim 11, wherein the tension member is integrated with the polymeric molded bottom seat panel during a molding process.

13. The lower seating structure of claim 8, wherein the polymeric molded bottom seat panel defines a lower surface of the lower seating structure and the tension member is disposed in juxtaposed relation below the lower surface of the lower seating structure.

* * * * *